(No Model.)
C. F. BUCKLEY.
PROCESS OF PRESERVING FRUITS, VEGETABLES, &c.
No. 558,629. Patented Apr. 21, 1896.
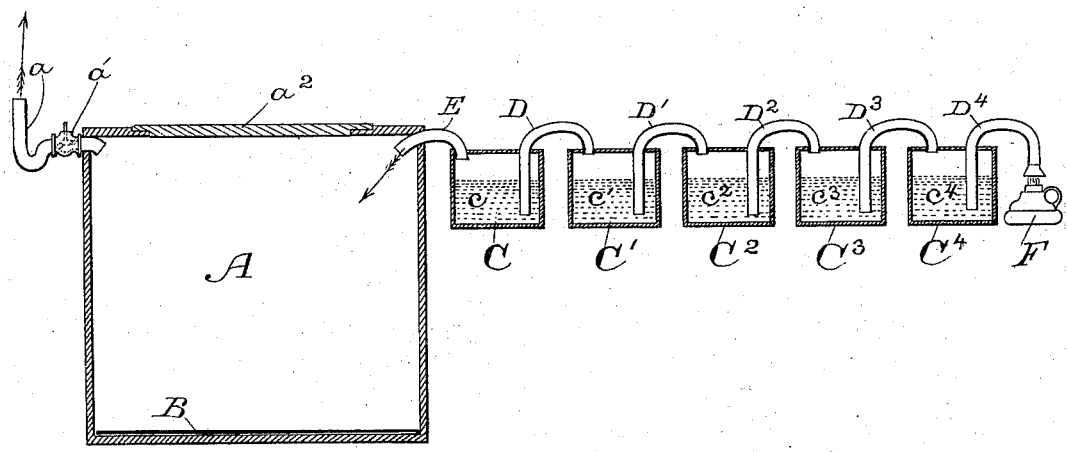

UNITED STATES PATENT OFFICE.

CORNELIUS F. BUCKLEY, OF SAN FRANCISCO, CALIFORNIA.

PROCESS OF PRESERVING FRUITS, VEGETABLES, &c.

SPECIFICATION forming part of Letters Patent No. 558,629, dated April 21, 1896.

Application filed January 14, 1895. Serial No. 534,859. (No specimens.)

*To all whom it may concern:*

Be it known that I, CORNELIUS F. BUCKLEY, a citizen of Great Britain, residing in the city and county of San Francisco, State of California, have invented an Improvement in Processes of Preserving Fruit, Vegetables, Meat, and other Perishable Articles; and I hereby declare the following to be a full, clear, and exact description of the same.

My invention relates to the art of preserving perishable articles, especially fruit, vegetables, and meat.

It consists in first innocuously sterilizing ordinary air, then in causing said air to serve as a vehicle for the vapor of an innocuous volatile sterilizing substance or compound, and finally in causing said vapor-carrying sterilized air to enter the compartment in which the materials to be preserved are confined and to displace the ordinary air therein.

It also consists in first subjecting ordinary air to heat, whereby it is sterilized in whole or in part, then in passing said air through a sterilizing compound or substance, or a series of the same, and finally in causing said air, either alone or with a sterilizing vapor, to enter the compartment in which the materials to be preserved are confined and to displace the ordinary air therein.

The object of my invention is to provide a simple and practicable means and process for preserving perishable articles, especially fruit, vegetables, and meat, so that they may be transported long journeys and may be kept as long as necessary.

Referring to the accompanying drawing for a more complete explanation of my invention, the figure is a view of my apparatus.

A is a suitable compartment which is air-tight. It has at one side, or in any other suitable position, an outlet $a$, which is preferably provided with a check-valve $a'$. Within this compartment, access to which is had through any suitable door, such as is indicated at $a^2$, the materials to be preserved are placed, and it will be found of advantage to put a layer of chlorid of sodium on the floor of the compartment, such layer being here represented by B.

C is a vessel exterior to the compartment A, having within it a suitable sterilizing substance or solution represented by $c$. Extending down into and below the surface of this solution or substance is a pipe D, the other end of which, for the present, may be regarded as being open to the exterior air. From the vessel C, above the surface of the solution or substance therein, issues a pipe E, which extends into the compartment A. It will now be seen that if the ordinary air in the compartment A be drawn out or driven out its place will be taken by air which passes through the pipe D, through the sterilizing solution or substance in vessel C, and through the pipe E, and this air will be sterilized by passing through said solution or substance.

The displacing of the original air may be accomplished in any suitable manner, as by means of an exhaust action or by means of the forcing of the incoming sterilized air into the compartment, whereby the original air is driven out through the exhaust $a$ and past the check-valve $a'$.

In practice it is found best, in order to thoroughly sterilize the air, to pass it through a series of connected vessels, such as I shall now describe.

I have accordingly shown other vessels C', $C^2$, $C^3$, and $C^4$, and other pipes D' $D^2$ $D^3$ $D^4$, which connect the space within each vessel above the sterilizing substance with the space below the sterilizing substance in the succeeding vessel, and under the last pipe $D^4$, which communicates with the exterior air, I have shown, as a means of producing a current through this series of vessels, a lamp F, though it will be understood that any other means may be used, such as an air-pump or blower or other device. The lamp is, however, the best, for in addition to serving to create a draft it subjects the air to heat, whereby it is initially sterilized in whole or in part.

In vessel C, I place a ten-per-cent. solution of formalin in alcohol. In vessel C' the sterilizing substance $c'$ is a chlorid of sodium solution. In vessel $C^2$ the substance $c^2$ is water. In vessel $C^3$ the substance $c^3$ is a solution of perchlorid of iron. In vessel $C^4$ the substance $c^4$ is bichlorid of mercury.

It is of course important that the air should be innocuously sterilized. This may be done by the use of innocuous substances or compounds, or by the use of such substances or compounds not wholly innocuous, but followed by the use of other substances by which the noxious properties left by the sterilizing treatment may be removed. As an example of this I have shown the highly effective but noxious bichlorid of mercury and perchlorid of iron, followed by water and chlorid of sodium, by which the air is rendered innocuous in addition to being sterilized, the sodium salt in particular being useful in absorbing the excess of the two prior chlorids.

It will be best to have the solution or substance in the vessel C, or the vessel nearest the compartment A, of a volatile as well as sterilizing character, in order that the vapors may be carried into the compartment by the air. The solution of formalin mentioned is of a volatile character, and in this connection I may also mention an alcoholic solution of lysol. These are both innocuous and may be used satisfactorily. The sterilized air thus serves as a vehicle to carry into the compartment a sterilizing innocuous vapor, which has its own effect directly upon the materials to be preserved, thus supplementing the effect of the sterilized air, which, while it tends to preserve the materials by not being the conveyer thereto of germs, will not of itself destroy germs already there; but this the sterilizing-vapor does.

Having thus described my invention, what I claim as new, and desire to secure by Letters Patent, is—

1. The process of sterilizing air which consists in passing the air through a germ-destroying liquid or liquids, and subsequently washing the same to remove the noxious product of such sterilization.

2. The process of sterilizing air which consists in a preliminary heating of the same and passing the air through a germ-destroying liquid or liquids, and subsequently washing the same to remove the noxious products of such sterilization.

3. The improvement in preserving perishable articles which consists in first sterilizing ordinary air by passing it through a germ-destroying liquid or liquids, then in removing from it any noxious properties left by the sterilizing treatment, then in causing it to take up and carry a vapor of an innocuous volatile sterilizing substance or compound, and, finally, in causing said vapor-carrying sterilized air to enter the compartment in which the materials to be preserved are confined, and to displace the ordinary air therein.

4. The improvement in preserving perishable articles which consists in first subjecting ordinary air to heat, then in sterilizing it by passing it through a germ-destroying liquid or liquids, then in removing from it any noxious properties left by the sterilizing treatment, then in causing it to take up and carry a vapor of an innocuous volatile sterilizing substance or compound, and, finally, in causing said vapor-carrying sterilized air to enter the compartment in which the materials to be preserved are confined and to displace the ordinary air therein.

5. The process of sterilizing air which consists in passing the air through bichlorid of mercury and perchlorid of iron to destroy its germs, and subsequently washing the air to remove the poisonous or other objectionable products of such sterilization, substantially as described.

6. The improvement in preserving perishable articles which consists in first sterilizing ordinary air by passing it through bichlorid of mercury and perchlorid of iron, to destroy its germs, then in washing the air to remove from it any noxious properties left by the sterilizing treatment, then in causing it to take up and carry a vapor of an innocuous volatile sterilizing substance or compound, and, finally, in causing said vapor-carrying sterilized air to enter the compartment in which the materials so be preserved are confined and to displace the ordinary air therein.

In witness whereof I have hereunto set my hand.

CORNELIUS F. BUCKLEY.

Witnesses:
JAS. E. WALSH,
S. H. NOURSE.